United States Patent
Yamaguchi et al.

(10) Patent No.: US 8,411,170 B2
(45) Date of Patent: Apr. 2, 2013

(54) IMAGE PROCESSING DEVICE AND IMAGE PROCESSING PROGRAM

(75) Inventors: Toshihiro Yamaguchi, Melville, NY (US); Tomohisa Hasumi, Kawaguchi (JP); Mayumi Nakayama, Meerbusch (DE); Nobuaki Seki, Yokohama (JP)

(73) Assignee: Nikon Corporation, Tokyo (JP)

( * ) Notice: Subject to any disclaimer, the term of this patent is extended or adjusted under 35 U.S.C. 154(b) by 355 days.

(21) Appl. No.: 12/692,244

(22) Filed: Jan. 22, 2010

(65) Prior Publication Data

US 2010/0194907 A1 Aug. 5, 2010

(30) Foreign Application Priority Data

Jan. 30, 2009 (JP) .................................. 2009-019264
Jan. 19, 2010 (JP) .................................. 2010-008994

(51) Int. Cl.
*H04N 5/335* (2011.01)
(52) U.S. Cl. ................................... 348/239; 348/207.99
(58) Field of Classification Search .................. 348/239, 348/207.99; 382/181–183, 192
See application file for complete search history.

(56) References Cited

U.S. PATENT DOCUMENTS

| 6,313,923 B1 | 11/2001 | Takanashi et al. |
| 2004/0051795 A1* | 3/2004 | Ajioka .......................... 348/239 |

FOREIGN PATENT DOCUMENTS

| JP | 04-096878 | 3/1992 |
| JP | A-08-251387 | 9/1996 |
| JP | A-11-191841 | 7/1999 |
| JP | A-2002-077566 | 3/2002 |
| JP | A-2007-295210 | 11/2007 |

OTHER PUBLICATIONS

Office Action issued in Japanese Application No. 2010-008994 dated Jan. 25, 2011 (with translation).

* cited by examiner

*Primary Examiner* — Tuan Ho
(74) *Attorney, Agent, or Firm* — Oliff & Berridge, PLC (57) ABSTRACT

An image processing device that rotates an image according to the inclination of a line segment included in the image, includes an evaluation unit 106 that evaluates a plurality of line segments whose inclinations are different, on the basis of each of a plurality of different decision standards, and a selection unit 106 that selects, on the basis of the results of the plurality of evaluations, from among the plurality of line segments, a line segment on the basis of which the image is to be rotated.

16 Claims, 10 Drawing Sheets

|  | a | b | c |
|---|---|---|---|
| ASPECT RATIO | 1.0 | 0.5 | 0.3 |
| DISTANCE FROM CENTRAL PORTION | 0.3 | 1.0 | 0.5 |
| DISTANCE FROM FOCUSING AREA | 0.3 | 1.0 | 0.5 |
| LINE SEGMENT INCLINATION DISTRIBUTION | 1.0 | 1.0 | 1.0 |
| TOTAL | 2.6 | 3.5 | 2.3 |

|  | a | b1 | b2 | c1 | c2 |
|---|---|---|---|---|---|
| ASPECT RATIO | 1.0 | 0.5 | 0.5 | 0 | 0 |
| DISTANCE FROM CENTRAL PORTION | 0 | 0.5 | 0.3 | 1.0 | 0 |
| DISTANCE FROM FOCUSING AREA | 0 | 0.5 | 0.3 | 1.0 | 0 |
| LINE SEGMENT INCLINATION DISTRIBUTION | 0.5 | 1.0 | 1.0 | 1.0 | 1.0 |
| TOTAL | 1.5 | 2.5 | 2.1 | 3.0 | 1.0 |

IMAGE PROCESSING DEVICE AND IMAGE PROCESSING PROGRAM

INCORPORATION BY REFERENCE

The disclosures of the following priority applications are herein incorporated by reference: Japanese Patent Applications Nos. 2009-019264, filed Jan. 30, 2009, and 2010-8994, filed Jan. 19, 2010.

BACKGROUND OF THE INVENTION

1. Field of the Invention

The present invention relates to an image processing device, an image processing method, and an image processing program.

2. Description of the Related Art

A technique is per se known for extracting a line segment (a "reference line") from an image, and correcting inclination of the image by rotating the image on the basis of the line segment (refer to Japanese Laid-Open Patent Publication 2007-295210).

SUMMARY OF THE INVENTION

In the prior art, a "reference line" of a predetermined length has been extracted. But if the "reference line" is only chosen by length, then sometimes it may be the case that it is not suitable for inclination correction.

The present invention is applied to an image processing device that rotates an image according to the inclination of a line segment that is included in that image. And the present invention includes: an evaluation unit that evaluates a plurality of line segments whose inclinations are different, on the basis of each of a plurality of different decision standards; and a selection unit that selects, based upon the plurality of evaluation results, from among line segments created by weighted averaging based upon the plurality of line segments and their evaluation results, a line segment on the basis of which the image is to be rotated.

And the image processing program according to the present invention causes a computer to execute: first evaluation processing of evaluating a plurality of line segments included in the image whose inclinations are different, on the basis of a first decision standard; second evaluation processing of evaluating the plurality of line segments on the basis of a second decision standard that is different from the first decision standard; selection processing of selecting, on the basis of the result of the first evaluation and the result of the second evaluation, from among the plurality of line segments, a line segment on the basis of which the image is to be rotated; and image rotation processing of rotating the image according to the inclination of the selected line segment.

According to the present invention, it is possible to perform correction of the inclination of an image in an appropriate manner.

DESCRIPTION OF THE PREFERRED EMBODIMENTS

Figure 1:
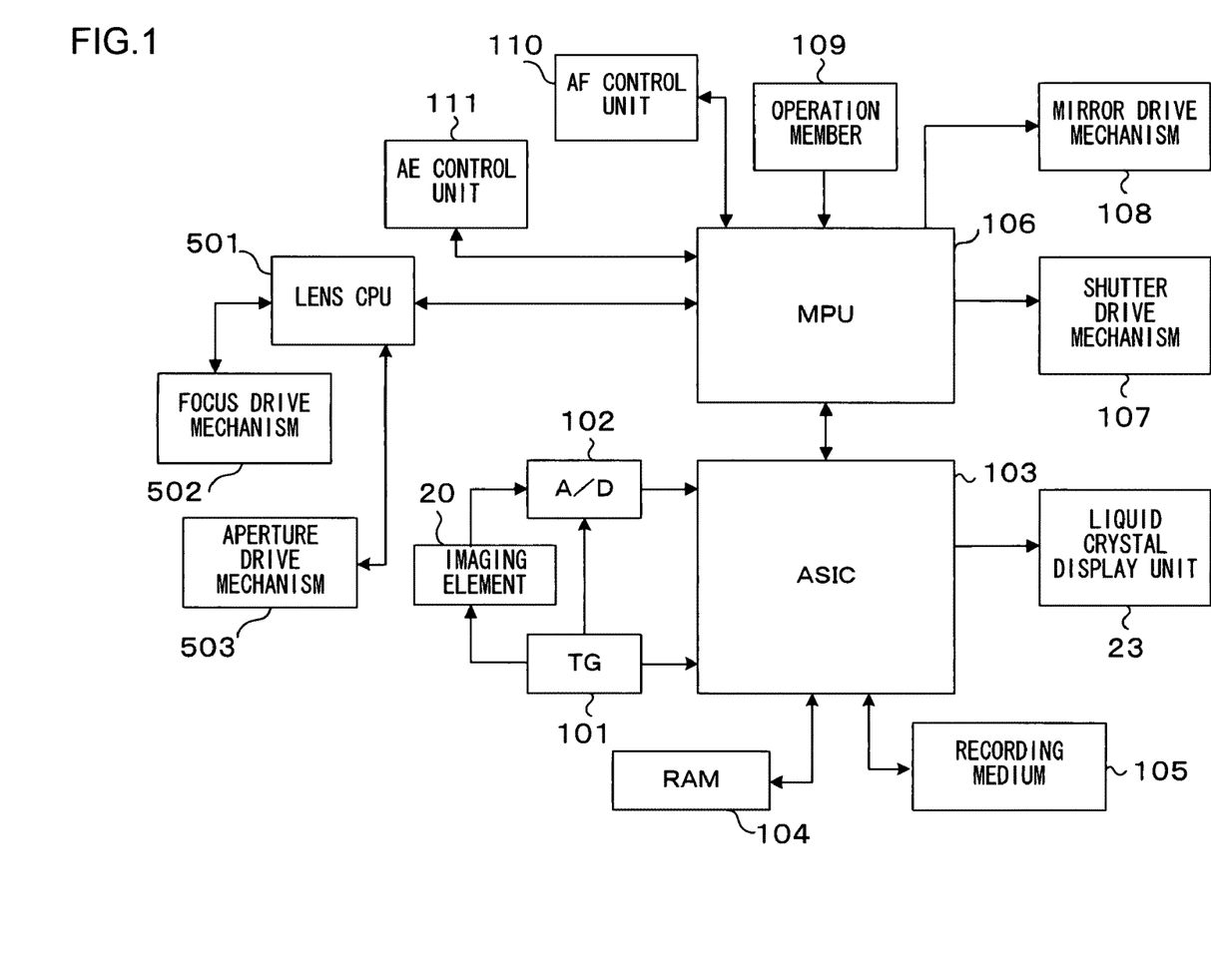
FIG. 1 is a block diagram showing the structure of an electronic camera according to one embodiment of the present invention.

Preferred embodiments for implementation of the present invention will now be explained with reference to the drawings. FIG. 1 is a block diagram showing an example of the circuit structure of an electronic camera according to one embodiment of the present invention. In FIG. 1, a timing circuit (TG) 101, an A/D conversion circuit 102, an imaging element 20, an ASIC 103, a RAM 104, a liquid crystal display unit 23, an MPU 106, a shutter drive mechanism 107, a mirror drive mechanism 108, operation members 109, an AF control unit 110, and an AE control unit 111 are provided to the camera main body side, and a removable recording medium 105 is also provided.

Furthermore, a photographic lens (not shown in the figures), a lens CPU 501, a focus drive mechanism 502, an aperture drive mechanism 503, and an aperture (likewise not shown) are provided to the lens barrel side (of the lens, not shown).

The timing circuit (TG) 101 generates a predetermined timing signal, and supplies this timing signal to each of the A/D conversion circuit 102, the ASIC 103, and the imaging element 20. An image of a photographic subject is imaged upon the photographic image surface of the imaging element 20 by the lens barrel. And the imaging element 20 captures this image of the photographic subject, and outputs a photoelectric conversion signal.

The A/D conversion circuit 102 converts the photoelectric conversion signal from the imaging element 20 (that is an analog image signal) into a digital signal. And the ASIC 103 performs predetermined image processing upon this image signal after digital conversion, and furthermore, according to requirements, may subject it to compression processing.

The RAM 104 is a memory that temporarily stores image data during processing by the ASIC 103. The recording medium 105 consists of a non-volatile memory or the like that stores the image data after processing by the ASIC 103 as an image file. And the liquid crystal display unit 23 displays a replay image that is created from the image data after processing by the ASIC 103.

The MPU 106 is a microprocessor: it inputs signal outputted from various blocks in FIG. 1, performs predetermined calculations, and outputs control signal to various blocks on the basis of the results of these calculations. The MPU 106 and the ASIC 103 mutually interchange control signals by serial communication.

According to a command sent from the MPU 106, the shutter drive mechanism 107 performs charging and drive control of a shutter (not shown in the figures). And, according to a command sent from the MPU 106, the mirror drive mechanism 108 controls mirror up driving and mirror down driving of a main mirror (also not shown in the figures).

The operation members 109 send setting and changeover signals to the MPU 106, according to setting and selection operations of various types. These operation members 109 include a half press switch, a full press switch, an sensitivity setting dial for setting image capture sensitivity (ISO sensitivity), a replay switch, a menu switch, and so on.

The half press switch and the full press switch operate together with depression operation of a release button (not shown in the figures), and each of them, when operated, outputs an ON signal to the MPU 106. The half press ON signal from the half press switch is outputted when the release button is pressed downwards to around half of its normal stroke, and, when this half stroke pressing down operation is released, the output of this signal is cancelled. And the full press ON signal from the full press switch is outputted when the release button is pressed downwards through substantially its entire normal stroke, and, when this full stroke pressing down operation is released, the output of this signal is cancelled.

The replay switch is a switch for reading out the data for an image file from the recording medium 105 and so on, and for displaying a replay image created from this image data upon the liquid crystal display unit 23. And the menu switch is a switch for causing a menu operation screen to be displayed upon the liquid crystal display unit 23, and for starting and ending operation for reception of various types of setting operation.

The AF control unit 110 performs focus detection calculation by a per se known phase difference method, using the detection signal from a sensor for focus detection that is not shown in the figures. By this calculation, the focus adjustment state (i.e. the defocus amount) for the photographic lens (not shown in the figures) is obtained, and a shift amount for a focusing lens (also not shown) included in the photographic lens is calculated according to this defocus amount. A signal that specifies the shift amount of the focusing lens is transmitted to a CPU 501 for the photographic lens via the MPU 106. The region within the photographic scene within which the defocus amount is obtained is termed the focusing area.

The AE control unit 111 calculates the luminance of the photographic subject using a detection signal from a sensor for photometry (not shown in the figures). Furthermore, the AE control unit 111 performs predetermined exposure calculation using an image capture sensitivity that is set with the sensitivity setting dial described above, lens information that is acquired by the MPU 106, and the photographic subject luminance that has been calculated, and determines an aperture value AV and a shutter speed TV.

The MPU 106 performs mutual communication with the CPU 501. By this communication, on the one hand lens information such as the aperture value and lens data and so on is transmitted to the MPU 106, and on the other hand lens control information such as the above described shift amount and drive commands for the focusing lens and so on are transmitted to the CPU 501.

The lens CPU 501 on the one hand transmits lens information such as the aperture data and lens data and so on to the MPU 106, and on the other hand acquires the lens control information such as the above described shift amount and drive commands for the focusing lens and so on from the MPU 106.

According to a command sent from the lens CPU 501, the focus drive mechanism 502 shifts the focusing lens in a predetermined direction by a predetermined amount with a drive force that is transmitted from the camera main body side. And the aperture drive mechanism 503 drives the aperture (not shown in the figures) through a predetermined number of steps, so as to open it to an aperture value that corresponds to a command sent from the lens CPU 501.

Since this embodiment of the present invention is particularly distinguished by its processing for correcting inclination of the image, the following explanation will concentrate upon this processing for inclination correction. This inclination correction means that, if the main photographic subject is inclined to either left or right, this inclination of the main photographic subject is reduced by rotating this image around its center as an axis. A straight line (i.e. a line segment within the image) that indicates the inclination of the main photographic subject will be termed the "reference line", and the necessary rotational angle that is required for inclination correction is calculated on the basis of this "reference line". For example, the rotational angle during inclination correction may be determined on the basis of the angle between this "reference line" and a horizontal line (or a vertical line).

Figure 2:
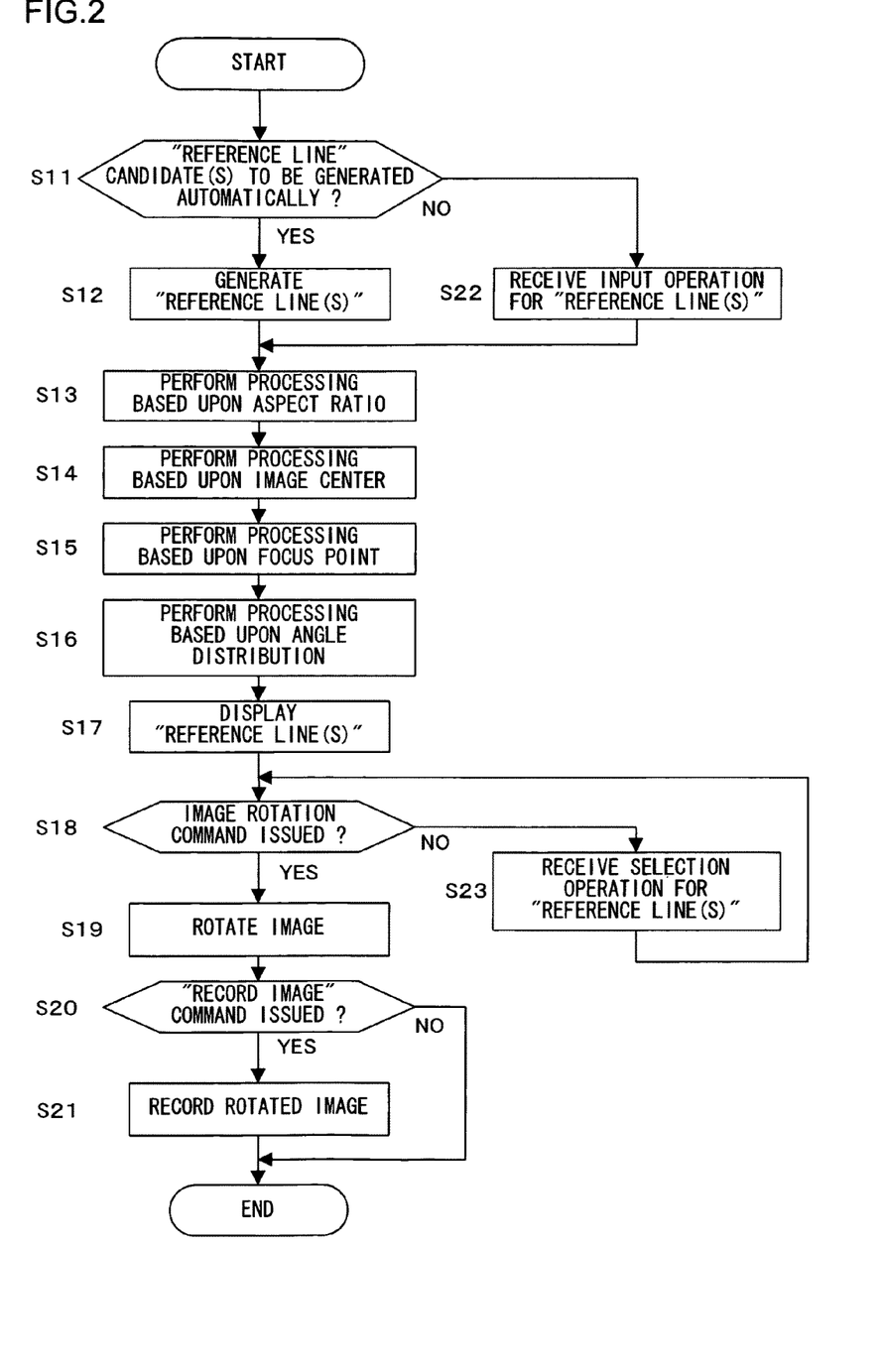
FIG. 2 is a flow chart for explanation of the flow of inclination correction processing.

When, in the state in which a replay image created from an image file recorded upon the recording medium 105 is being displayed upon the liquid crystal display unit 23, the item "inclination correction" is instructed by operation of the menu, the MPU 106 of this electronic camera repeatedly executes the processing shown by way of example in FIG. 2. FIG. 2 is a flow chart for explanation of the flow of this inclination correction processing.

In a first step S11 of FIG. 2, the MPU 106 makes a decision as to whether or not a "reference line" candidate is to be generated automatically. In this embodiment, it is arranged for the user to be able to select in advance either a method of, during inclination correction, automatically extracting a straight line (i.e. a line segment) to be used as the "reference line" from the image that is being displayed upon the liquid crystal display unit 23, or a method of taking, as the "reference line", a straight line (i.e. a line segment) that connects between two points designated by operation signals from the operation members 109. If the former method is selected, the MPU 106 reaches an affirmative decision in this step S11 and the flow of control proceeds to a step S12, whereas, if the latter method is selected, a negative decision is reached in this step S11 and the flow of control is transferred to a step S22.

In the step S22, the MPU 106 receives input operation to specify a "reference line". In concrete terms, a straight line that connects between two points in the replay image that are commanded by operation signals from the operation members 109 is registered as the "reference line", and then the flow of control is transferred to a step S13. It should be understood that it is arranged for it to be possible to input, for example, up to a maximum of five "reference lines".

In the step S12, the MPU 106 extracts a straight line (i.e. a line segment) that is included in the replay image being displayed upon the liquid crystal display unit 23, and takes this straight line (i.e., line segment) that has been extracted as the "reference line"; and then the flow of control proceeds to the step S13. The MPU 106 may, for example, be set so as to repeat this procedure of straight line extraction until five "reference lines" have been generated.

In the step S13, the MPU 106 assigns weightings to the "reference lines" on the basis of their aspect ratios. The MPU 106 calculates a weight weight_a or weight_a' according to Equation (1) or Equation (2) below. According to Equations (1) and (2), the calculated value for the weight is greater, the closer the component of the "reference line" in the horizontal direction is to the length of the horizontal edge of the image, or the closer the component of the "reference line" in the vertical direction is to the length of the vertical edge of the image.

$$\text{weight}\_a = b\text{Length} \times \cos\theta / i\text{Width} \quad (1)$$

Here, θ is the angle between the "reference line" and a horizontal line (θ<45°) and bLength is the length of the "reference line", while iWidth is the length of the horizontal edge of the image (in other words, the width of the image).

$$\text{weight}\_a' = b\text{Length} \times \cos(90° - \theta) / i\text{Height} \quad (2)$$

Here, θ is the angle between the "reference line" and a horizontal line (θ≧45°) and bLength is the length of the "reference line", while iHeight is the length of the vertical edge of the image (in other words, the height of the image).

Figure 3:
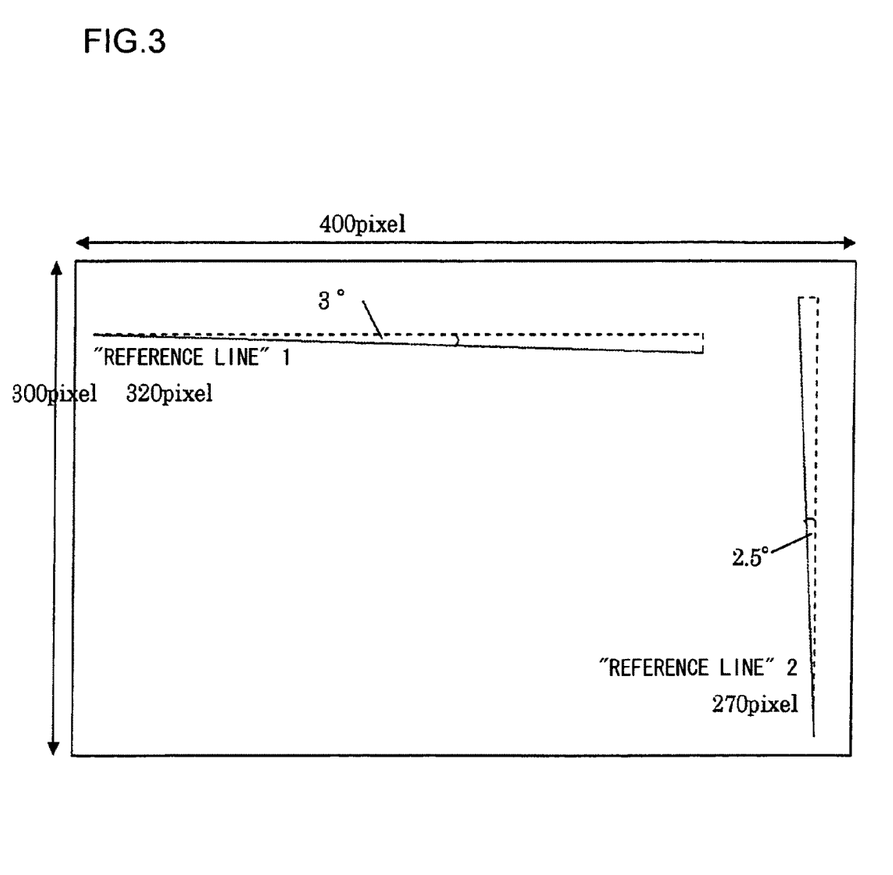
FIG. 3 is a figure for explanation of weighting on the basis of aspect ratio.

This process of weighting on the basis of aspect ratio will now be explained with reference to FIG. 3. In FIG. 3, the horizontal component BLW1 of the "reference line" #1" is 320 pixels×cos (3°). In this case, weight_a=BLW1/iWidth is 0.79. Here, iWidth is 400 pixels. On the other hand, the vertical component BLW2 of the "reference line" #2" is 270 pixels×cos (2.5°). In this case, weight_a'=BLW2/iHeight is 0.899. Here, iHeight is 300 pixels. The MPU 106 assigns ranks to the plurality of "reference lines" on the basis of the magnitude relationships between the weights weight_a and weight_a'. In the case of this example, between "reference line" #1" and "reference line" #2", "reference line" #2" has a higher rank than "reference line" #1".

In the next step S14, the MPU 106 assigns weightings to the "reference lines" on the basis of the center of the image when the image was photographed. The MPU 106 calculates weights Z_1 according to the following Equation (3), on the coordinates of the pixels that make up the image. According to Equation (3), the weight Z_1 is higher, the closer the coordinates within the "reference lines" are to the center of the image. And the weight weight_1 of each of the "reference lines" is, in each case, the integrated value of Equation (3) over the range from the start point (×1,y1) of the "reference line" to its end point (x2,y2), as shown in Equation (4). The MPU 106 assigns ranks to the plurality of "reference lines" on the basis of the magnitude relationships between these weights weight_1.

$$Z\_1(x,y) = -(x-a)^2 - (y-b)^2 + \text{maxValue} \quad (3)$$

Here, the coordinate (x,y) is the coordinate of a pixel which constitutes a "reference line," and the position represented with (x,y)=(0,0) corresponds to the lower left corner of the image. The position represented with (x,y)=(a,b) corresponds to the optical axis. It should be understood that when the lens optical axis coincides with the center of the image, then a is iWidth/2, b is iHeight/2, iWidth is the width of the image, iHeight is the height of the image, and maxValue is a predetermined value.

The weight of a "reference line" is calculated as $$\text{weight}\_1 = (\Sigma - Z\_1(x,y) / b\text{Length} \quad (4)$$

Here, the summation on the right hand is carried out only for the pixels included in the reference line, and therefore, the calculation is done only with the pixels with coordinate (x,y) included in the "reference line".

In the next step S15, the MPU 106 assigns weightings to the "reference lines" on the basis of the focus point (i.e. area) when the image was photographed. The MPU 106 calculates weights Z_fp on the coordinates of the pixels that make up the "reference lines", according to the following Equation (5). According to Equation (5), the weight Z_fp is higher, the closer the coordinate is to the barycenter of the focus point (i.e., area). And the weight weight_fp of the "reference line" is the integrated value of Equation (5) over the range from the start point (x1,y1) of the "reference line" to its end point (x2,y2), as shown in Equation (6). It should be understood that focus point information is recorded in a tag region of the image file, that is in Exif format. The MPU 106 assigns ranks to the plurality of "reference lines" on the basis of the magnitude relationships between the weights weight_fp.

$$Z\_fp(x,y) = -(x - fpX)^2 - (y - fpY)^2 + \text{maxValue} \quad (5)$$

Here, the coordinate (x,y) is the coordinate of a pixel which constitutes a "reference line," and the position represented with (x,y)=(fpX,fpY) corresponds to the barycenter of the focus point (i.e., area). It should be understood that when the barycenter of the focus point (i.e., area) coincides with the center of the image, then fpX is iWidth/2, fpY is iHeight/2, iWidth is the width of the image, iHeight is the height of the image, and maxValue is a predetermined value.

The weight of a "reference line" is calculated as $$\text{weight}\_fp = \Sigma Z\_fp(x,y) / b\text{Length} \quad (6)$$

Here, again the summation on the right hand side is carried out only for the pixels with coordinates (x,y) included in the "reference line".

In the next step S16, the MPU 106 assigns weightings to the "reference lines" on the basis of the distribution of the angles of inclination of the "reference lines". The MPU 106 performs automatic creation of "reference lines" by internal processing, irrespective of whether or not "reference line" candidates are generated automatically as described above. The upper limit for the number of "reference lines" may be, for example, 100. The MPU 106 also detects the angle that each of the "reference lines" that have been created makes with a horizontal line (i.e. the inclination angle), and displays the distribution of these angles in a histogram like the example shown in FIG. 4. In the FIG. 4 display, the inclination angles are divided up into sections two degrees wide, and the number of "reference lines" that are included in each section is shown as a frequency.

Figure 4:
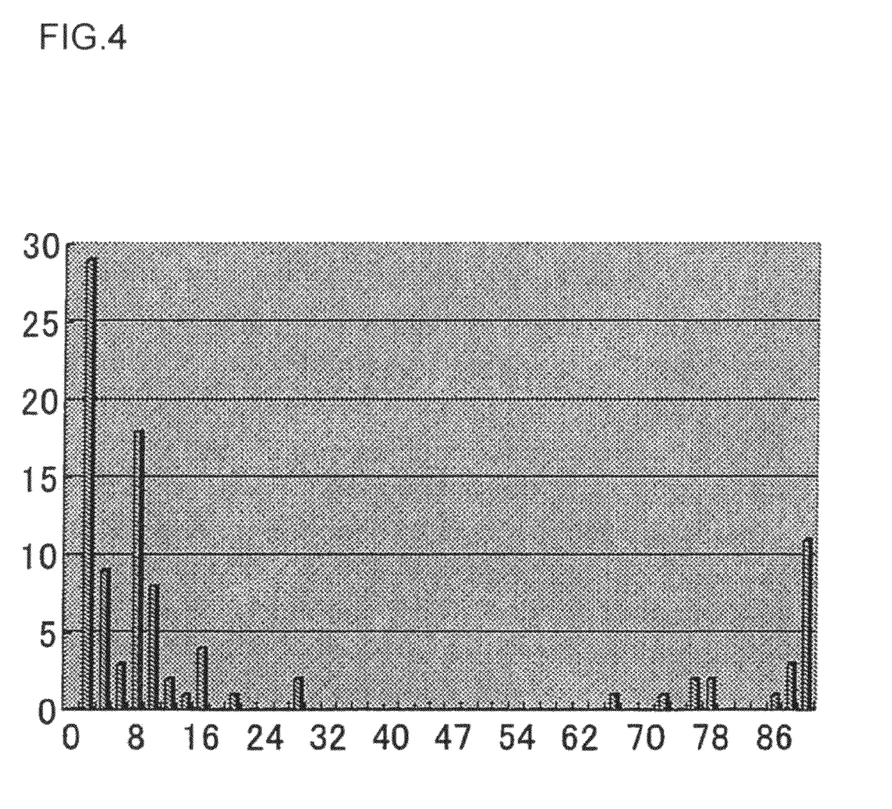
FIG. 4 is a figure showing an example of a distribution of angles.

The MPU 106 calculates weights weight_dn (for 1≦n≦45) for each section on the basis of the distribution of the angles of inclination of the "reference lines", according to the following Equation (7).

$$\text{weight}\_dn = (\text{number of "reference lines" in section } n)^2 / (\text{total number of "reference lines" in all sections}) \quad (7)$$

According to Equation (7), the weights of the "reference lines" that belong to the angle of inclination section in which the maximum number of "reference lines" is present become highest. And the MPU 106 assigns ranks to the plurality of "reference lines" on the basis of the magnitude relationships between the weights weight_dn. It should be understood that, if a plurality of "reference lines" are present within the same section, then all of these "reference lines" within which same section are assigned the same rank. Moreover, in the case of this example, the grading between the "reference lines" goes up to five, and rank levels of six and further are not assigned.

In the next step S17, the MPU 106 performs ranking display of the "reference lines" upon the liquid crystal display unit 23. On the basis of the ranks assigned in the processing of each of the steps S13 through S16, the MPU 106 assigns 1 point to the "reference line" of the first rank in each of the processing steps, 0.5 points to each of the "reference lines" of the second rank, and 0.3 points to each of the "reference lines" of the third rank. And the "reference lines" are then given a priority order, according to the values of the total points assigned to them.

Figure 5:
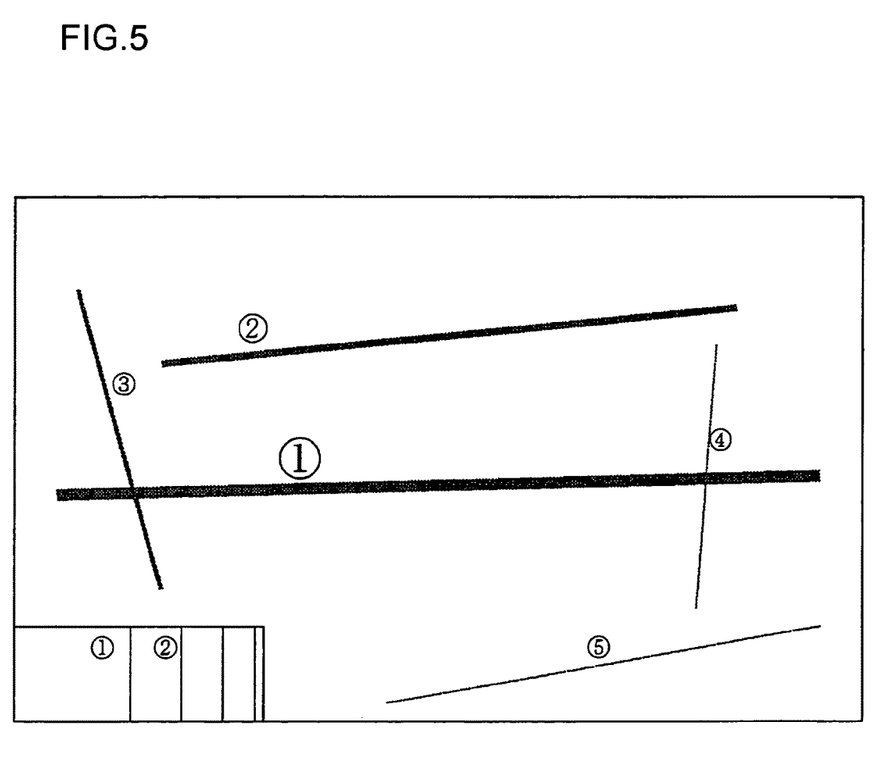
FIG. 5 is a figure for explanation of an example of a rank display.

FIG. 5 is a figure for explanation of an example of the display of the "reference lines" in ranking priority order. In FIG. 5, the "reference line" #1" that is the first in the priority order, the "reference line" #2" that is the second in the priority order, . . . and the "reference line" #5" that is the fifth in the priority order are all displayed in different thicknesses and colors. And, at the lower left portion of the screen, images showing what the image would look like after amendment if it were to be inclination corrected (i.e., rotated) using the various "reference lines" are shown, arranged in order from the one that corresponds to the first in priority order. In other words, the lower left image #1 is an image corrected on the basis of the "reference line" #1", the lower left image #2 is an image corrected on the basis of the "reference line" #2", and so on.

It should be understood that it would also be acceptable to arrange for changeover control of the display screen of the liquid crystal display unit 23 to be performed with a display changeover command, so that the lower left image #1~the lower left image #5 are displayed in sequence.

In the next step S18, the MPU 106 makes a decision as to whether or not a rotate command has been issued. If an operation signal has been inputted from the operation members 109 indicating that an "execute" command has been issued while one of the "reference lines" being displayed upon the rank display screen shown by way of example in FIG. 5 is selected, then the MPU 106 reaches an affirmative decision in this step S18 and the flow of control proceeds to a step S19. But if no such command indicating issue of an "execute" command has been inputted from the operation members 109, then the MPU 106 reaches a negative decision in this step S18 and the flow of control is transferred to a step S23.

In the step S23, the MPU 106 receives from the operation members 109 an operation signal that commands "changeover of selection" from the "reference line" that is currently selected to some other different "reference line", and then the flow of control returns to the step S18. Initially, the MPU automatically selects the "reference line" #1" that is first in the priority order, and, if an operation signal that commands "changeover of selection" has been inputted, it changes over the selected "reference line" according to that operation signal.

If in the step S23 described above an operation signal has been received from the operation members 109 in which a plurality of "reference lines" are selected, then the MPU 106 creates a new "reference line" having an inclination that is the average of the inclinations of that plurality of "reference lines" that are selected, and displays this new "reference line" upon the rank display screen shown by way of example in FIG. 5, in addition to the other "reference lines" thereon. In this case, this new "reference line" is displayed in a thickness and a display color that are different from those of the "reference line" #1" through the "reference line" #5" that are already present. The MPU 106 takes this new "reference line" as a subject for "changeover of selection" as well, and then the flow of control returns to the step S18.

On the other hand, in the step S19, on the basis of the "reference line" that is selected, the MPU 106 reduces the inclination of the main photographic subject by rotating the image that is being displayed upon the liquid crystal display unit 23 around its center, and then the flow of control proceeds to a step S20.

In this step S20, the MPU 106 makes a decision as to whether or not a "record image" command has been issued. And, if an operation signal that indicates a "record image" command has been inputted from the operation members 109, then the MPU 106 reaches an affirmative decision in this step S20, and the flow of control proceeds to a step S21. On the other hand, if no such operation signal that indicates a "record image" command has been inputted from the operation members 109, then the MPU 106 reaches a negative decision in this step S20, and the processing of FIG. 2 terminates.

In the next step S21, the MPU 106 performs updating of the image file upon the recording medium 105 so that it now contains the image after rotation, and then the processing of FIG. 2 terminates.

According to the embodiment explained above, the following beneficial operational effects are obtained.

(1) Since it is arranged, when rotating the image according to the angle of inclination of the "reference line" included in the image, to perform an evaluation for each of the plurality of "reference lines" that have different inclinations on the basis of the plurality of different decision standards, and to select one "reference line" for rotating the image, from among this plurality of "reference lines", on the basis of the results of this plurality of evaluations according to these different decision standards, accordingly it is possible to correct the inclination of the image by using that "reference line" that is most appropriate.

(2) Since a decision standard is provided by which a higher weight is assigned, the closer is the length of the component of the "reference line" in the horizontal direction to the length of the horizontal side of the image, or the closer is the length of its component in the vertical direction to the length of the vertical side of the image, accordingly it is possible to assign a higher rank to a reference line whose beneficial effect for correction of inclination is higher.

Figure 7:
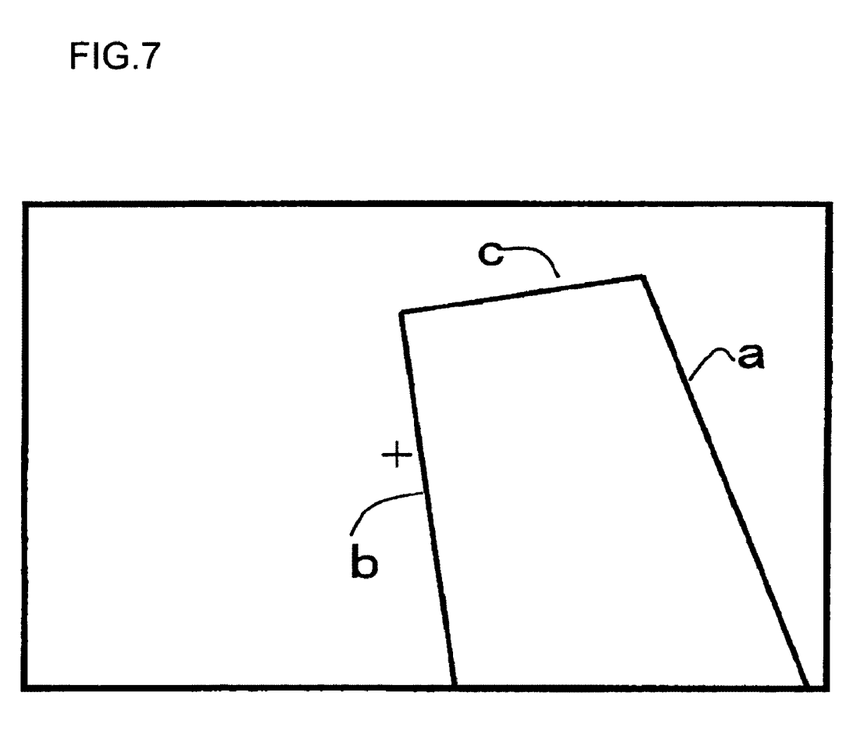
FIG. 7 is a figure showing an example of an image that is to be a subject for inclination correction processing.
Figure 8:
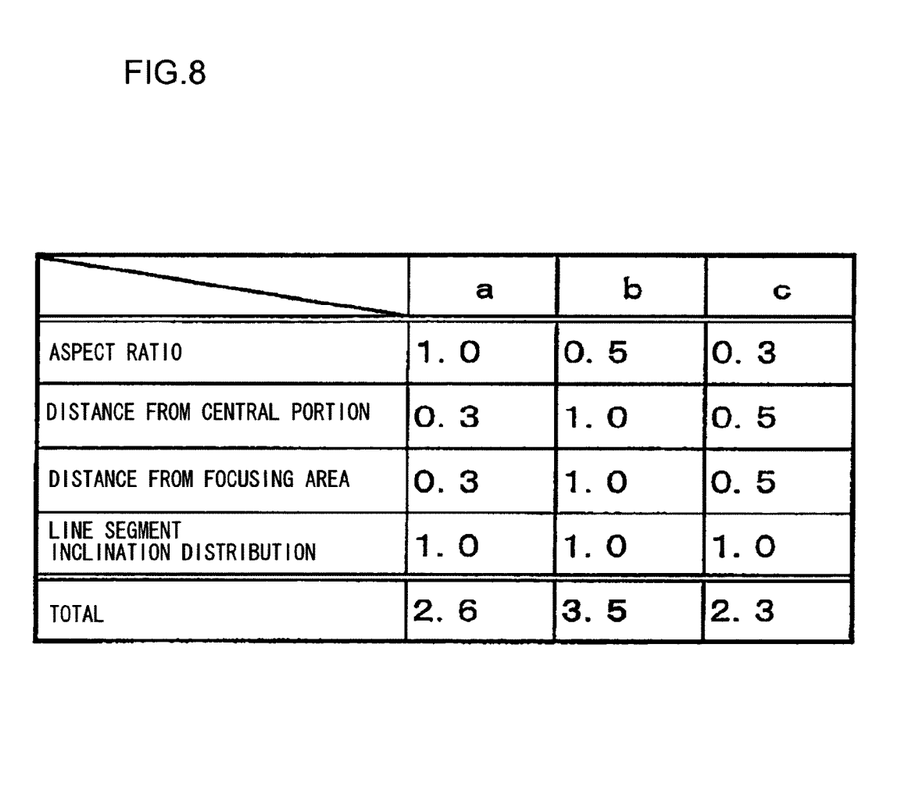
FIG. 8 is a figure showing an example of points assigned to each of a plurality of "reference lines" and of their totals.

(3) Since a decision standard is provided by which a higher weight is assigned, the closer the "reference line" is to the center of the image, accordingly it is possible to assign a high range to a "reference line" whose beneficial effect for correction of inclination is high, such as, for example, a "reference line" that is included in the main photographic subject region, or the like. As an example, a case will be explained in which an image (refer to FIG. 7) has been photographed using a wide angle lens while looking up at a high-rise building. In FIG. 7, the high-rise building is photographed towards the right side with respect to the center of the image. Moreover, the upper portion of the building is shrunk down in the photograph. Yet further, due to the fact that the camera was tilted during photography, the entire building appears to be inclined in the image. It should be understood that the line segment a, the line segment b, and the line segment c are "reference lines" that are used by the MPU 106 for inclination correction processing. FIG. 8 is a figure showing an example of the points assigned by the processing of the steps S13 through S16 to each of these "reference lines", and the totals of these points. When a "reference line" is chosen only by length, as with the prior art technique, the greatest weighting is assigned to the line segment a, and this is not desirable; but by contrast, with this embodiment, since higher weighting is given to "reference lines" that are closer to the center of the image, accordingly the points for the line segment b are increased. Since due to this rotation is performed based upon the line segment b whose weight is the higher, accordingly it becomes possible to perform more appropriate rotation processing for reducing the inclination of this high-rise building.

(4) Since a decision standard is provided by which a higher weight is assigned, the closer the "reference line" is to the barycenter of the focusing area, accordingly, for example, it is possible to raise the rank of a "reference line" such as one that is included in the main photographic subject region or the like, whose beneficial effect for inclination correction will be higher.

Figure 9:
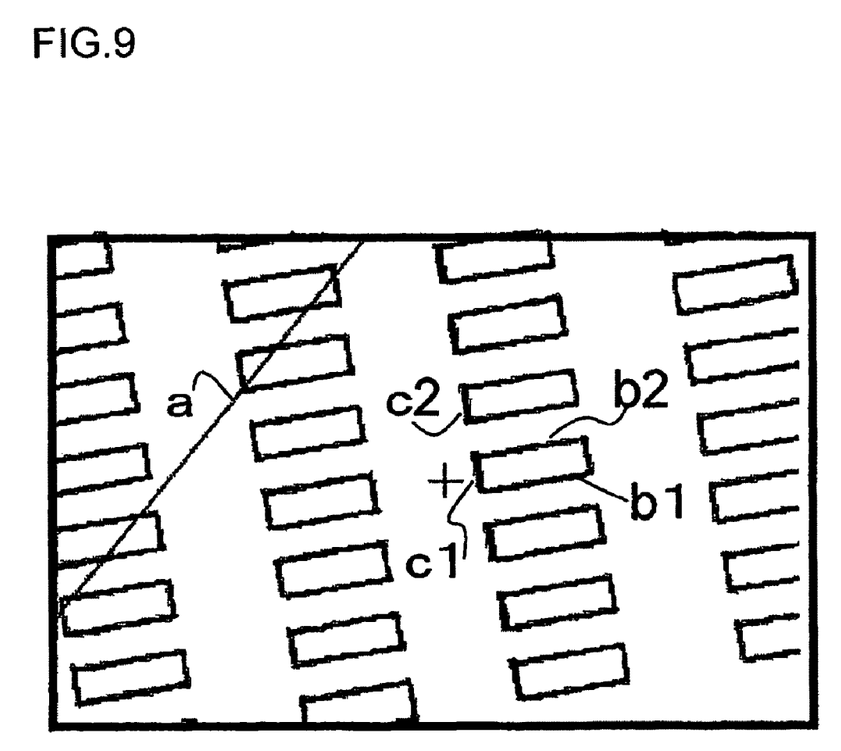
FIG. 9 is a figure showing another example of an image that is to be a subject for inclination correction processing.
Figure 10:
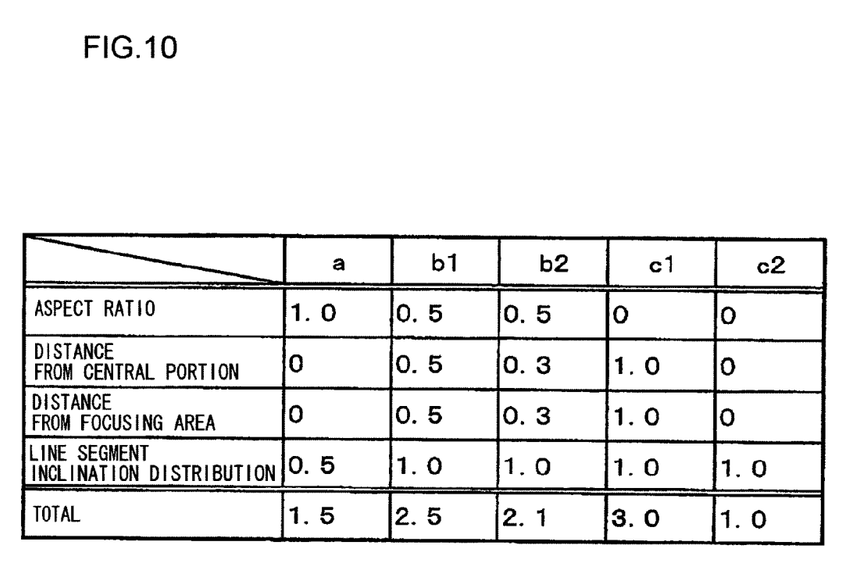
FIG. 10 is a figure showing another example of points assigned to each of a plurality of "reference lines" and of their totals.

(5) Since, on the basis of the distribution of the inclinations of the plurality of reference lines, a decision standard is provided by which a higher weight is assigned to a "reference line" that belongs to an inclination section into which the number of the "reference lines" that are distributed is greater, accordingly it is possible to increase the ranks of a group of "reference lines" for which the chance of obtaining a beneficial effect by inclination correction is high. As an example, a case will be explained (FIG. 9) of an image in which an intermediate portion of a high-rise building has been photographed by using a telephoto lens. In FIG. 9, window frames have been photographed so as to occupy the entire area of the screen. Moreover, due to the camera having been tilted during photography, all of these window frames are tilted. Furthermore, an electrical cable (corresponding to the line segment a) has also been included in the photograph. It should be understood that the line segment a, the line segment b1, the line segment b2, the line segment c1, and the line segment c2 are "reference lines" that the MPU 106 is using for inclination correction processing. FIG. 10 is a figure showing an example of the points assigned by the processing of the steps S13 through S16 to each of these "reference lines", and the totals of these points. When a "reference line" is chosen only by length, as with the prior art technique, the greatest weighting is assigned to the line segment a, and this is not desirable; but by contrast, with this embodiment, since higher weightings are given to "reference lines" that have inclinations that agree with the inclinations of a large number of other reference lines, accordingly the points assigned to the line segment c1 are increased. Since due to this rotation is performed based upon the line segment c1 whose weight is the higher, accordingly it becomes possible to perform more appropriate rotation processing for reducing the inclinations of these room frames.

(6) Since ranks are allocated to the plurality of "reference lines" on the basis of the overall evaluation results, accordingly it becomes possible to choose a "reference line" that, overall, provides a high chance of obtaining beneficial effects for correction of inclination.

(7) Since it is arranged to select a "reference line" for rotating the image on the basis of the overall evaluation results, accordingly it is possible to choose a recommended "reference line" automatically.

(8) Since it is arranged for the "reference line" indicated upon the screen showing the plurality of "reference lines" and ranks that is provided upon the liquid crystal display unit 23 to be selectively changeable according to operation signals from the operation members, accordingly it becomes possible to perform inclination correction in accordance with the intentions of the user.

Variant Embodiment #1

It would also be acceptable to arrange to provide an inclination detection sensor to the camera main body, and to reflect the angle of inclination and/or the angle of elevation of the camera main body in the weighting processing described above by using the detection signal from that inclination detection sensor.

Variant Embodiment #2

It would also be acceptable, in the step S23 described above, for operation signals that select a plurality of "reference lines" to be received from the operation members 109. In this case, a new "reference line" may be obtained by selecting a "reference line" that has an inclination intermediate between those of the plurality of "reference lines" that are selected, or by creating a "reference line" having an inclination that is obtained as a weighted average of the plurality of selected "reference lines", while taking their weights into consideration.

Variant Embodiment #3

In the embodiments described above, different types of weighting were performed in each of the steps S13 through S16, and a priority order was assigned to the "reference lines" by giving consideration to the results of these weighting processes. Instead of this, it would also be acceptable to arrange, in the processing of the steps S13 through S16, to receive a command from the user to accord different weightings to any one, or any two, or any three of these processes, only, and then to assign a priority order to the "reference lines" according to the results of these weighting processes only. For example if, by operating the operation members, the user has selected only processing on the basis of the inclination distribution of the "reference lines" and processing on the basis of the focusing area, then it would be acceptable to arrange for the MPU 106 to omit the processing of the step S13 and the processing of the step S14.

Variant Embodiment #4

Figure 6:
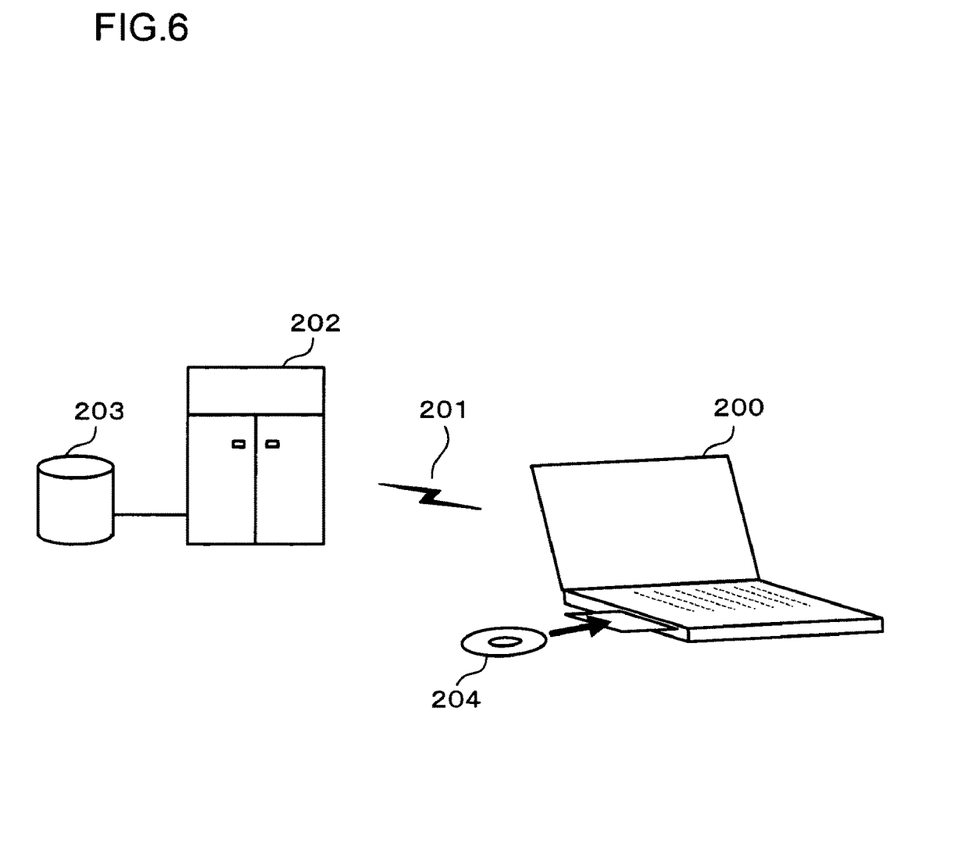
FIG. 6 is a figure showing an example of a computer device.

While an example has been explained in which inclination correction processing was performed by an electronic camera, it would also be acceptable to provide an image processing device by executing an image processing program that performs the processing shown in FIG. 2 upon the computer device shown in FIG. 6. If the image processing program is to be used by reading it into the personal computer 200, then, once the program has been loaded into a data storage device of the personal computer 200, the computer can be used as an image processing device by executing that program.

The loading of the program into the personal computer 200 may be performed by loading a recording medium 204 such as a CD-ROM or the like upon which the program is stored into the personal computer 200, or may be performed by loading the program into the personal computer 200 via a method that employs a communication circuit 201 such as a network or the like. If the method of using a communication circuit 201 is employed, then the program is stored upon a hard disk device 203 or the like of a server (i.e. a computer) 202 that is connected to the communication circuit 201. Thus this image processing program may be supplied as a computer program product in various formats, i.e. as a recording medium 204 or via a communication circuit 201 or the like.

Variant Embodiment #5

While, as an example, an electronic camera has been explained, the present invention may also be implemented as an electronic device such as a photo-viewer or the like.

Variant Embodiment #6

In the embodiment described above it was arranged to assign points to the "reference lines" according to the order assigned by the processing of the steps S13 through S16 (i.e., to the first ranked line, 1.0 points; to the second ranked line, 0.5 points; and to the third ranked line, 0.3 points). Instead of this, during processing, among the processing of the steps S13 through S16, for which a command has been received from the user, it would also be acceptable to arrange to assign points of the same value (for example 0.5 points) to any of the "reference lines" ranked in the assigned order as the first through the third.

Variant Embodiment #7

When assigning points in the step S17 to the "reference lines" to which ranks have been assigned by the step S14 (processing on the basis of the center of the image), it would also be acceptable to arrange to assign more points, the shorter was the focal length of the lens during photography (i.e., the wider angle was the lens). For example, if the photography was performed with a lens of 50 mm focal length or greater, then 0.5 points may be allocated to the first ranked "reference line", 0.3 points may be allocated to the second ranked "reference line", and 0.1 points may be allocated to the third ranked "reference line". And, if the photography was performed with a lens of less than 50 mm focal length, then 1.0 points may be allocated to the first ranked "reference line", 0.5 points may be allocated to the second ranked "reference line", and 0.3 points may be allocated to the third ranked "reference line".

The embodiments described above are examples, and various modifications can be made without departing from the scope of the invention.

What is claimed is:

1. An image processing device that rotates an image according to an inclination of a line segment included in the image, comprising:
    an evaluation unit that evaluates a plurality of line segments whose inclinations are different, on a basis of each of a plurality of different decision standards; and
    a selection unit that selects, on the basis of the results of the plurality of evaluations, from among the plurality of line segments, a line segment on the basis of which the image is to be rotated, wherein
    the evaluation unit evaluates each of the line segments higher, the closer the line segment is to a center of the image.

2. The image processing device according to claim 1, wherein the evaluation unit evaluates each of the line segments higher, the closer a length of a component of the line segment in a horizontal direction is to the length of a horizontal side of the image, or the closer the length of the component of the line segment in a vertical direction is to the length of a vertical side of the image.

3. The image processing device according to claim 1, wherein, on the basis of a distribution of the plurality of line segments into sections according to inclination, the evaluation unit evaluates a line segment higher that belongs to an inclination section in that distribution to which a large number of line segments belong.

4. The image processing device according to claim 1, wherein the selection unit selects a line segment on the basis of which the image is to be rotated by combining the results of the evaluations for the plurality of line segments according to the plurality of decision standards.

5. The image processing device according to claim 4, further comprising:
    a rank assignment unit that assigns ranks to the plurality of line segments according to the combined evaluation results; and
    a display control unit that displays a screen upon a display device, in which the plurality of line segments and their ranks are shown.

6. The image processing device according to claim 5, wherein, after the display is provided, the selection unit changes over the line segment on the basis of which the image is to be rotated, from the line segment that was selected on the basis of the plurality of evaluation results, to a line segment that is commanded according to an operation signal from an operation member.

7. An image processing method for rotating an image in correspondence to an inclination of a line included in the image, comprising:
    an evaluating step of evaluating a plurality of line segments each of which inclination angle is different, on a basis of a plurality of different decision standards; and
    a selecting step of selecting, on the basis of the results of the plurality of evaluations, from among the plurality of line segments, a line segment on the basis of which the image is to be rotated, wherein
    in the evaluating step, a line segment that is closer to a center of the image is evaluated higher.

8. A non-transitory computer-readable manufactured program product, including a program that causes a computer to execute an image processing method according to claim 7.

9. An image processing device that rotates an image according to an inclination of a line segment included in the image, comprising:
    an evaluation unit that evaluates a plurality of line segments whose inclinations are different, on a basis of each of a plurality of different decision standards; and
    a selection unit that selects, on the basis of the results of the plurality of evaluations, from among the plurality of line segments, a line segment on the basis of which the image is to be rotated, wherein
    the evaluation unit evaluates each of the line segments higher, the closer the line segment is to a barycenter of a focusing area.

10. The image processing device according to claim 9, wherein the evaluation unit evaluates each of the line segments higher, the closer a length of a component of the line segment in a horizontal direction is to the length of a horizontal side of the image, or the closer the length of the component of the line segment in a vertical direction is to the length of a vertical side of the image.

11. The image processing device according to claim 9, wherein, on the basis of a distribution of the plurality of line segments into sections according to inclination, the evaluation unit evaluates a line segment higher that belongs to an inclination section in that distribution to which a large number of line segments belong.

12. The image processing device according to claim 9, wherein the selection unit selects a line segment on the basis of which the image is to be rotated by combining the results of the evaluations for the plurality of line segments according to the plurality of decision standards.

13. The image processing device according to claim 12, further comprising:
    a rank assignment unit that assigns ranks to the plurality of line segments according to the combined evaluation results; and
    a display control unit that displays a screen upon a display device, in which the plurality of line segments and their ranks are shown.

14. The image processing device according to claim 13, wherein, after the display is provided, the selection unit changes over the line segment on the basis of which the image is to be rotated, from the line segment that was selected on the basis of the plurality of evaluation results, to a line segment that is commanded according to an operation signal from an operation member.

15. An image processing method for rotating an image in correspondence to an inclination of a line included in the image, comprising:
    an evaluating step of evaluating a plurality of line segments each of which inclination angle is different, on the basis of a plurality of different decision standards; and
    a selecting step of selecting, on the basis of the results of the plurality of evaluations, from among the plurality of line segments, a line segment on the basis of which the image is to be rotated, wherein
    in the evaluating step, a line segment that is closer to a barycenter of a focusing area is evaluated higher.

16. A non-transitory computer-readable manufactured program product, including a program that causes a computer to execute an image processing method according to claim 15.

* * * * *